(12) United States Patent
Bagepalli et al.

(10) Patent No.: US 8,591,187 B2
(45) Date of Patent: Nov. 26, 2013

(54) SYSTEM AND METHOD FOR DETECTING LOADS TRANSMITTED THROUGH A BLADE ROOT OF A WIND TURBINE ROTOR BLADE

(75) Inventors: Bharat Bagepalli, Niskayuna, NY (US); Nilesh Tralshawala, Rexford, NY (US); Aditi Koppikar, Bangalore (IN); Sascha Schieke, Greer, SC (US); Pekka Sipilae, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/312,271

(22) Filed: Dec. 6, 2011

(65) Prior Publication Data

US 2012/0134809 A1 May 31, 2012

(51) Int. Cl.
*F03D 11/00* (2006.01)
(52) U.S. Cl.
USPC ... 416/1; 416/30; 416/43; 416/61; 416/204 R
(58) Field of Classification Search
USPC ......... 415/118; 416/1, 30, 43, 61, 204 R, 248
See application file for complete search history.

(56) References Cited

U.S. PATENT DOCUMENTS

| | | | |
|---|---|---|---|
| 5,945,665 A | 8/1999 | Hay | |
| 7,517,194 B2 * | 4/2009 | Doorenspleet et al. | ... 416/204 R |
| 2009/0068014 A1 * | 3/2009 | Enevoldsen et al. | ............ 416/61 |
| 2009/0116962 A1 | 5/2009 | Pedersen et al. | |
| 2009/0129925 A1 | 5/2009 | Vronsky et al. | |
| 2009/0246019 A1 | 10/2009 | Volanthen et al. | |
| 2010/0004878 A1 | 1/2010 | Volanthen et al. | |
| 2010/0052320 A1 * | 3/2010 | Hoffmann | ....................... 290/44 |
| 2010/0133814 A1 | 6/2010 | Schulten | |
| 2010/0232963 A1 | 9/2010 | Volanthen et al. | |

FOREIGN PATENT DOCUMENTS

| | | |
|---|---|---|
| GB | 2464961 | 5/2010 |
| WO | WO 2010/049736 A1 * | 5/2010 |
| WO | WO 2010061290 | 6/2010 |
| WO | WO 2010139613 | 12/2010 |

OTHER PUBLICATIONS

Load Control Technologies, Assembly of Bolted Joints Presentation, 1-18.

* cited by examiner

*Primary Examiner* — Edward Look
*Assistant Examiner* — Maxime Adjagbe
(74) *Attorney, Agent, or Firm* — Dority & Manning, P.A.

(57) ABSTRACT

In one aspect, a system for detecting loads transmitted through a blade root of a rotor blade of a wind turbine is disclosed. The system may include a root attachment assembly configured to couple the blade root to a hub of the wind turbine. The root attachment assembly may include a barrel nut mounted within a portion of the blade root and a root bolt extending from the barrel nut. In addition, the system may include a sensor associated with the root attachment assembly. The sensor may be configured to detect loads transmitted through at least one of the barrel nut and the root bolt.

17 Claims, 5 Drawing Sheets

SYSTEM AND METHOD FOR DETECTING LOADS TRANSMITTED THROUGH A BLADE ROOT OF A WIND TURBINE ROTOR BLADE

FIELD OF THE INVENTION

The present subject matter relates generally to wind turbines and, more particularly, to a system and method for detecting and/or controlling loads transmitted through a blade root of a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, each rotor blade is subject to deflection and/or twisting due to the aerodynamic wind loads acting on the blade, which results in reaction loads transmitted through blade and into the blade root. These loads eventually result in bending and torque loads applied through the wind turbine hub, which, in turn, cause bending and twisting of the main shaft of the wind turbine. When the loads transmitted through the blade root are significantly high, substantial damage may occur to the wind turbine hub, the main shaft and/or various other component of the wind turbine.

Accordingly, a system and method for detecting and controlling loads transmitted through the blade root of a wind turbine rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a system for detecting loads transmitted through a blade root of a rotor blade of a wind turbine. The system may include a root attachment assembly configured to couple the blade root to a hub of the wind turbine. The root attachment assembly may include a barrel nut mounted within a portion of the blade root and a root bolt extending from the barrel nut. In addition, the system may include a sensor associated with the root attachment assembly. The sensor may be configured to detect loads transmitted through at least one of the barrel nut and the root bolt.

In another aspect, the present subject matter discloses a rotor blade for a wind turbine. The rotor blade may include a body extending between a blade root and a blade tip and a root attachment assembly configured to couple the blade root to a hub of the wind turbine. The root attachment assembly may include a barrel nut mounted within a portion of the blade root and a root bolt extending from the barrel nut. In addition, the rotor blade may include a sensor associated with the root attachment assembly. The sensor may be configured to detect loads transmitted through at least one of the barrel nut and the root bolt.

In a further aspect, the present subject matter discloses a method for controlling loads transmitted through a blade root of a rotor blade of a wind turbine. The method may include receiving with a controller a signal associated with a load transmitted through a root attachment assembly of the rotor blade, wherein the root attachment assembly includes a barrel nut mounted within a portion of the blade root and a root bolt extending from the barrel nut, and controlling an operational parameter of the wind turbine based on the load transmitted through the attachment assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is generally directed to a system and method for detecting and controlling loads transmitted through the blade root of a wind turbine rotor blade. In particular, the present subject matter discloses the use of one or more sensors mounted within the barrel nut and/or the root bolt of one or more root attachment assemblies of the rotor blade. The sensors may be configured to determine the loads transmitted through the blade root by detecting the loads transmitted through the barrel nut(s) and/or the root bolt(s). The load measurements provided by each sensor may then be transmitted to a suitable controller configured to control the loads acting on the blades. For example, the controller may be configured to adjust the pitch angle of one or more of the rotor blades (e.g., by transmitting control signals to the pitch adjustment mechanism of each rotor blade) in order to reduce or otherwise control the loads acting on the rotor blades. As such, controller may actively adjust loading on the rotor blades based on the load measurements provided by the sensors, thereby preventing and/or reducing the likelihood of damage that may otherwise be caused to the rotor hub, the main shaft and/or any other components of the wind turbine as a result of excessive loads being transmitted through the blade root and into the hub.

Figure 1:
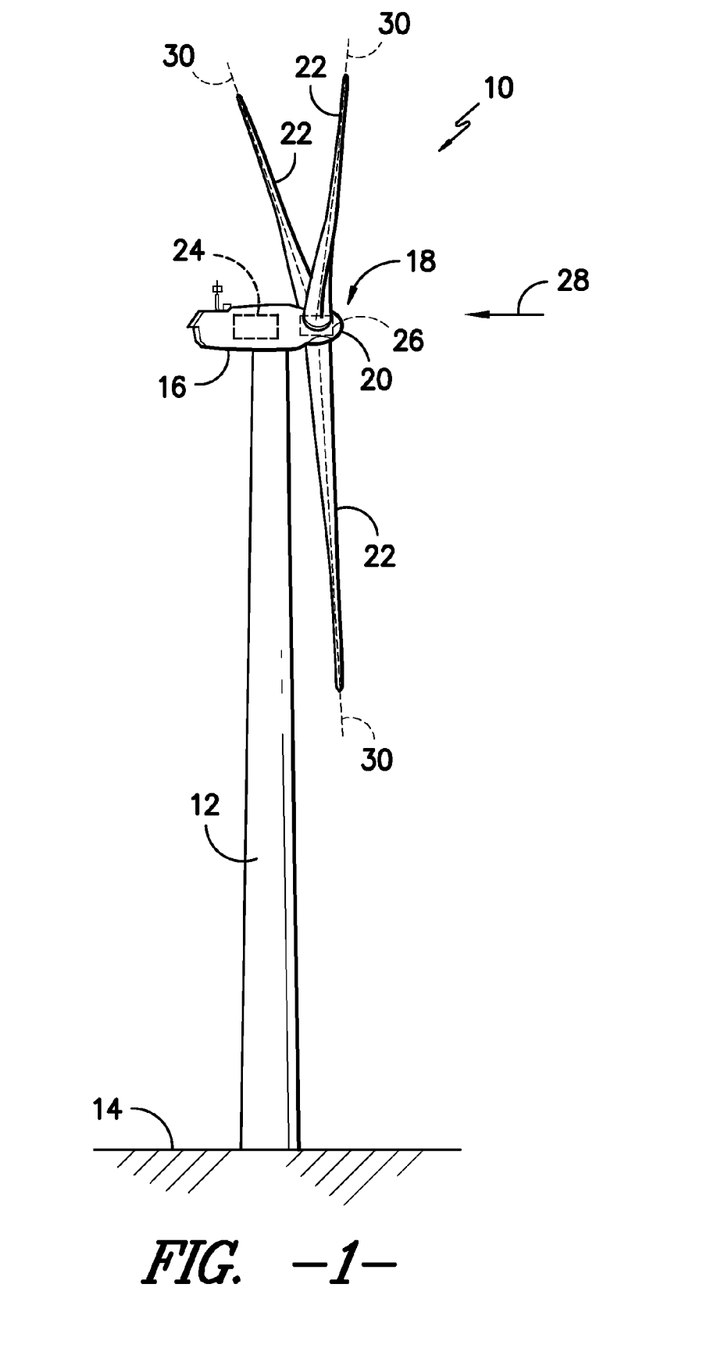
FIG. 1 illustrates a perspective view of one embodiment of a wind turbine.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22.

Additionally, the wind turbine 10 may also include a turbine control system or turbine controller 24 centralized within the nacelle 16. However, it should be appreciated that the turbine controller 24 may be disposed at any location on or in the wind turbine 10, at any location on the support surface 14 or generally at any other location. The turbine controller 24 may generally be configured to control the various operating modes (e.g., start-up or shut-down sequences) and/or the components of the wind turbine 10. For example, the turbine controller 24 may be configured to transmit suitable control signals to a pitch controller 26 mounted within the rotor hub 20 for controlling the blade pitch or pitch angle of each rotor blade 22 (i.e., an angle that determines a perspective of the blade 22 with respect to the direction 28 of the wind). As is generally understood, the pitch angle may be adjusted about a pitch axis 30 of each rotor blade 22 in order to control the loads acting on the blades 22 (i.e., by adjusting an angular position the rotor blades 22 relative to the wind). Thus, in several embodiments, the pitch controller 26 may control the loads acting on the rotor blades 22 by transmitting suitable control signals to a pitch adjust mechanism 32 (FIG. 3) of each rotor blade 22.

It should be appreciated that the turbine controller 24 and/or the pitch controller 26 may generally comprise a computer or any other suitable processing unit. Thus, in several embodiments, the turbine controller 24 and/or pitch controller 26 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 24 and/or pitch controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 24 and/or pitch controller 26 to perform various functions including, but not limited to, storing, processing and/or analyzing signals transmitted from sensors (e.g., the sensors 60, 70, 72 described below with reference to FIGS. 3 and 4), transmitting suitable control signals to the pitch adjustment mechanisms 32 (FIG. 3) and/or the like. In addition, the turbine controller 24 and/or pitch controller 26 may also include various input/output channels for receiving inputs from sensors and/or other measurement devices and for sending control signals to various components of the wind turbine 10.

Figure 2:
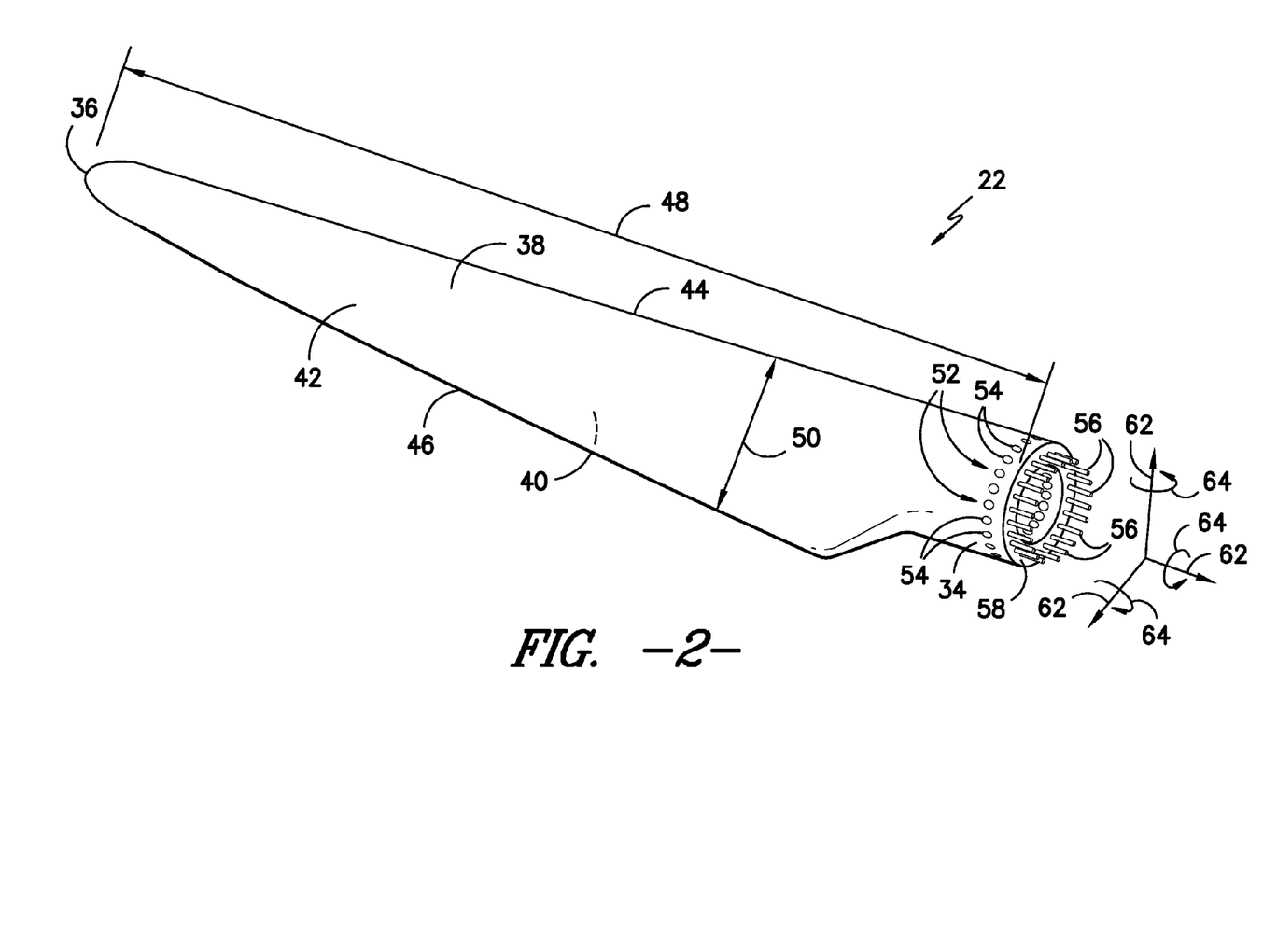
FIG. 2 illustrates a perspective view of one embodiment of one of the rotor blades shown in FIG. 1.

Referring now to FIG. 2, a perspective view of one of the rotor blades 22 shown in FIG. 1 is illustrated in accordance with aspects of the present subject matter. As shown, the rotor blade 22 includes a blade root 34 configured for mounting the rotor blade 22 to the hub 20 of a wind turbine 10 (FIG. 1) and a blade tip 36 disposed opposite the blade root 34. A blade body 38 of the rotor blade 22 may extend lengthwise between the blade root 34 and the blade tip 36 and may generally serve as the outer shell of the rotor blade 22. As is generally understood, the blade body 38 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the blade body 38 may generally include a pressure side 40 and a suction side 42 extending between a leading edge 44 and a trailing edge 44. Additionally, the rotor blade 22 may have a span 48 defining the total length of the blade body 38 between the blade root 34 and the blade tip 36 and a chord 50 defining the total length of the blade body 38 between the leading edge 44 and the trailing edge 46. As is generally understood, the chord 50 may vary in length with respect to the span 48 as the blade body 38 extends from the blade root 34 to the blade tip 36.

Moreover, as shown, the rotor blade 22 may also include a plurality of T-bolts or root attachment assemblies 52 for coupling the blade root 34 to the hub 20 of the wind turbine 10. In general, each root attachment assembly 52 may include a barrel nut 54 mounted within a portion of the blade root 34 and a root bolt 56 coupled to and extending from the barrel nut 54 so as to project outwardly from a root end 58 of the blade root 34. By projecting outwardly from the root end 58, the root bolts 56 may generally be used to couple the blade root 34 to the hub 20 (e.g., via a pitch bearing 60 (FIG. 3)), as will be described in greater detail below with reference to FIG. 3.

As described above, during operation of the wind turbine 10, aerodynamic wind loads acting on the rotor blade 22 may be transmitted through the blade root 34 and into the hub 20. As shown in FIG. 2, these loads result in shaft forces 62 and bending moments 64 (including torque loads) applied through the hub 20, which may, in turn, result in bending and/or twisting of the main shaft (not shown) of the wind turbine 10.

Figure 3:
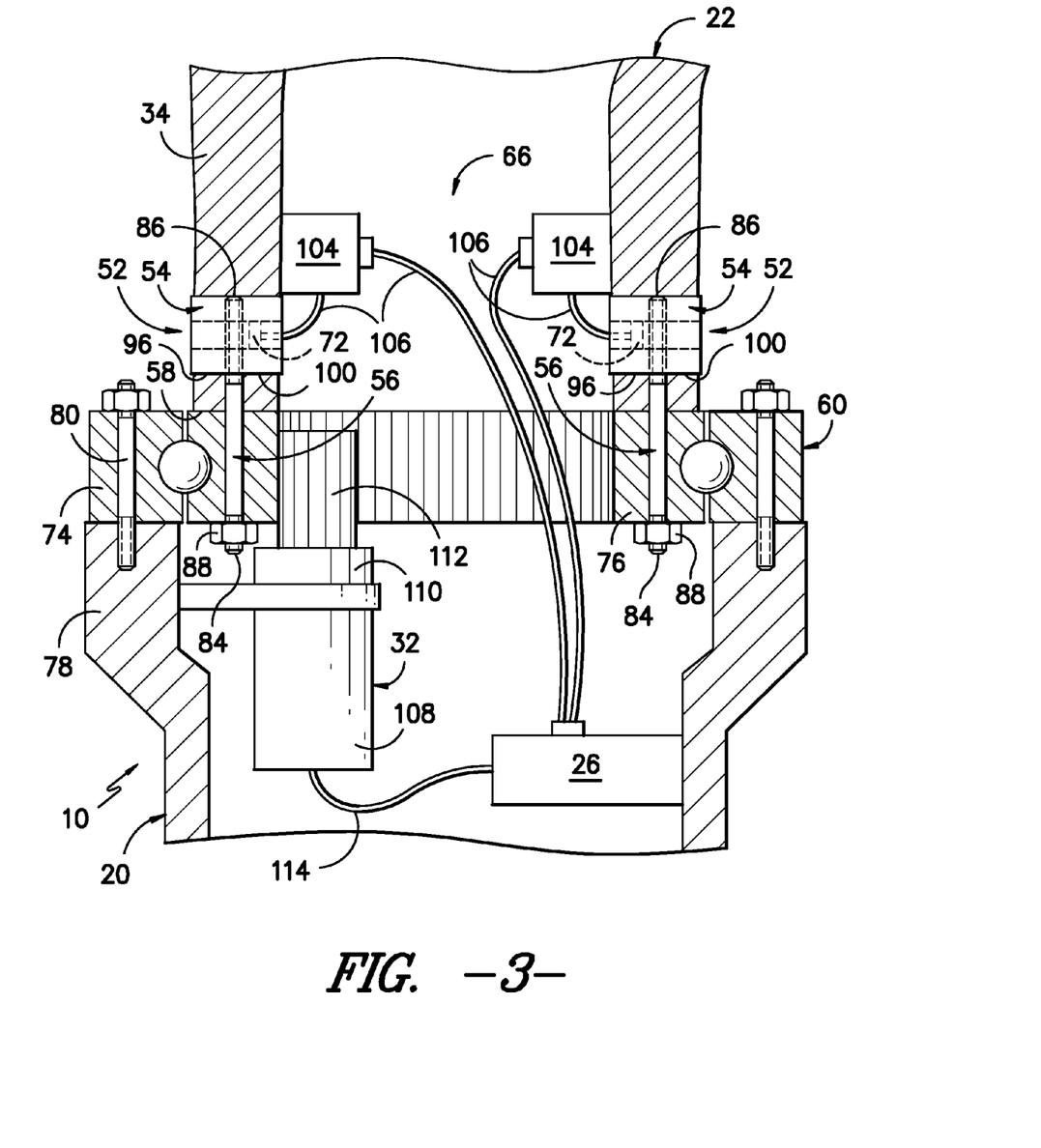
FIG. 3 illustrates a partial, cross-sectional view of the rotor blade shown in FIG. 2 mounted to the hub of a wind turbine, particularly illustrating one embodiment of a system for detecting loads transmitted through the blade root of the rotor blade.
Figure 4:
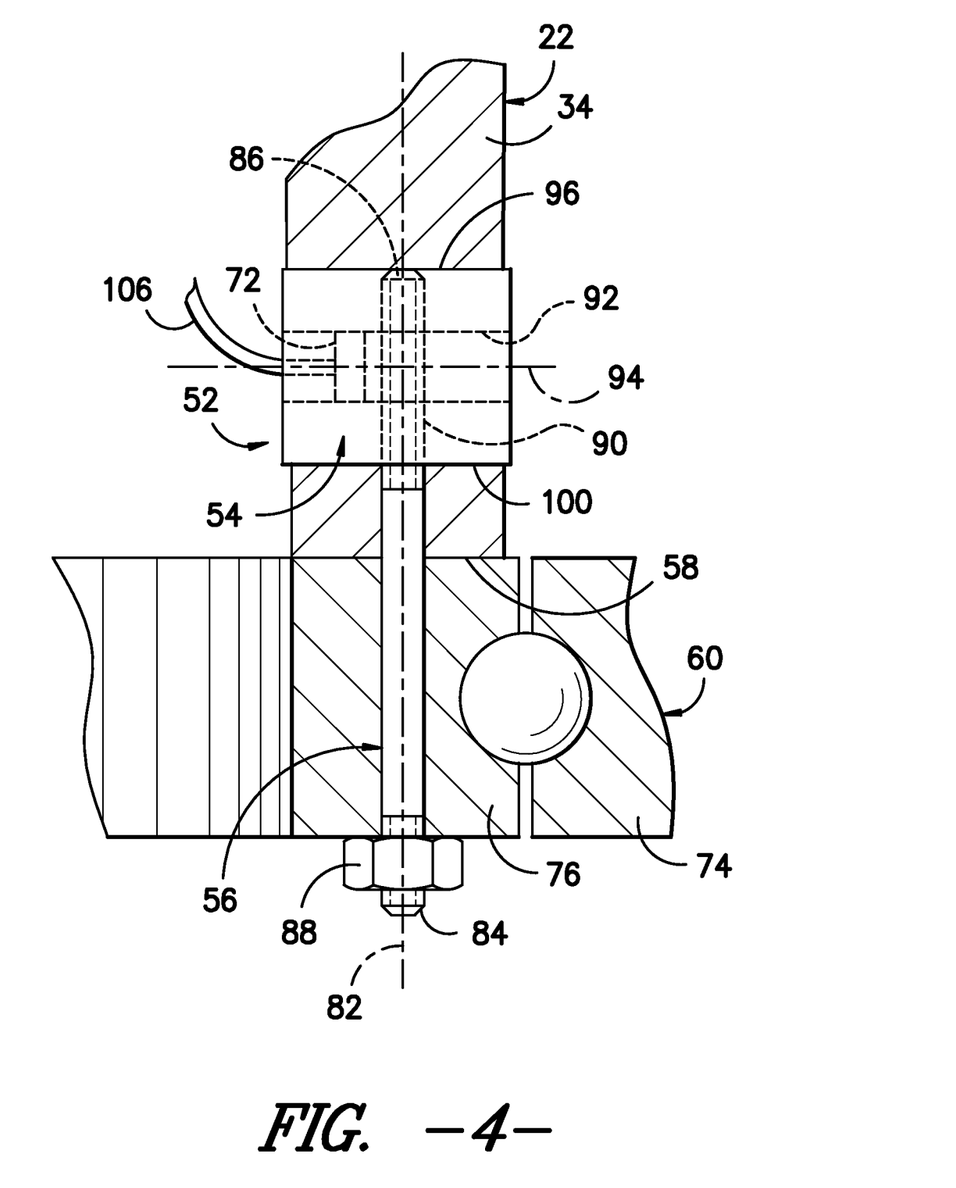
FIG. 4 illustrates an enlarged view of one of the root attachment assemblies of the rotor blade shown in FIG. 3, particularly illustrating a sensor of disclosed system installed within a barrel nut of the root attachment assembly.
Figure 5:
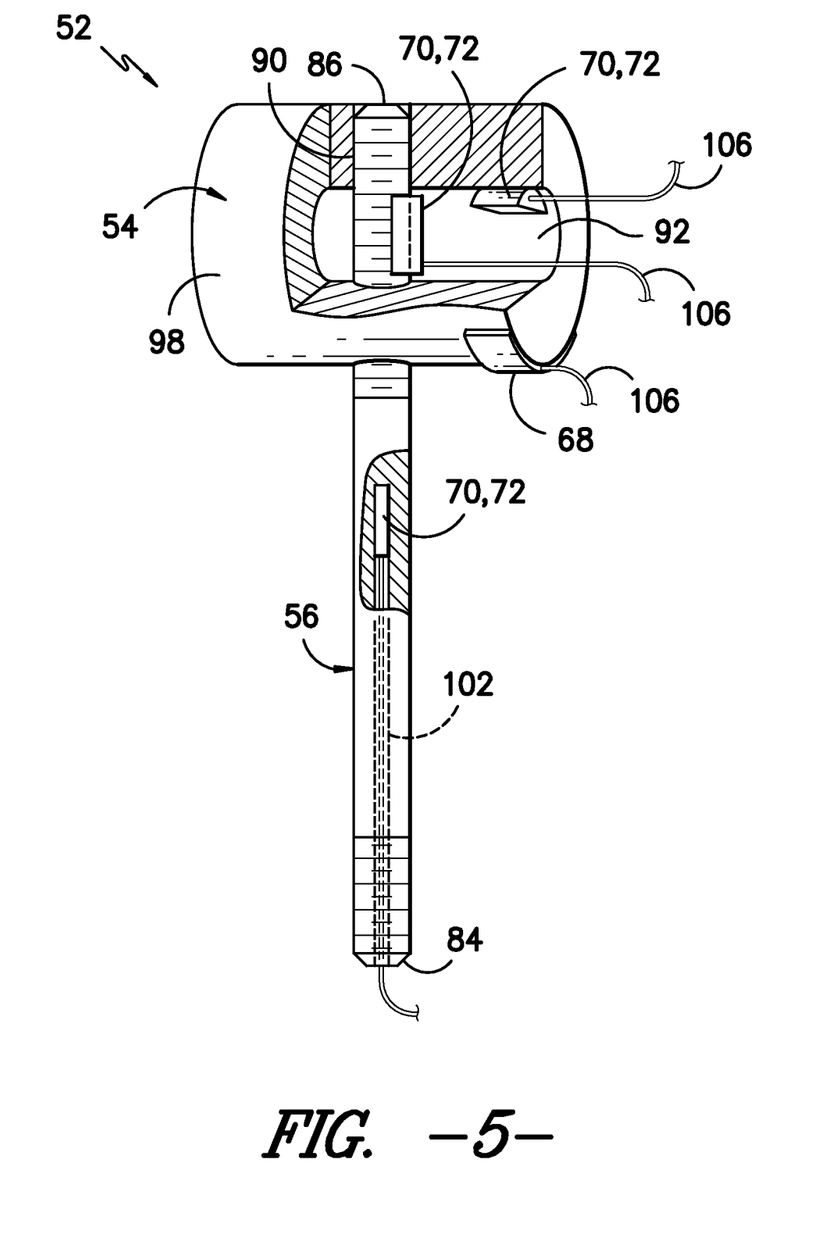
FIG. 5 illustrates a perspective, partially cut-away view of one of the root attachment assemblies of the rotor blade shown in FIG. 3, particularly illustrating various different sensor locations for several embodiments of the disclosed system for detecting loads transmitted through the blade root of the rotor blade.

Referring now to FIGS. 3-5, there are illustrated differing views of several embodiments of a system 66 for detecting and/or controlling loads transmitted through the blade root 34 of a rotor blade 22. In particular, FIG. 3 illustrates a partial, cross-sectional view of the rotor blade 22 shown in FIG. 2 mounted onto the hub 20 of a wind turbine 10, particularly illustrating the rotor blade 22 having components of the system 66 installed therein. FIG. 4 illustrates an enlarged view of one of the root attachment assemblies 52 of the rotor blade 22 shown in FIG. 3. Additionally, FIG. 5 illustrates a perspective, partially cut-away view of one of the root attachment assemblies 52 of the rotor blade 22, particularly illustrating several embodiments of suitable locations for positioning one or more sensors 68, 70, 72 of the system 66 on and/or within the barrel nut 54 and the root bolt 56 of the root attachment assembly 52.

As shown in FIG. 3, in several embodiments, the rotor blade 22 may be coupled to the hub 20 of the wind turbine 10 through a pitch bearing 60. In general, the pitch bearing 60 may include an outer bearing race 74 and inner bearing race 76. The outer bearing race 74 may generally be configured to be mounted to a hub flange 78 of the hub 20 using a plurality of hub bolts 80 and/or other suitable fastening mechanisms. Similarly, the inner bearing race 76 may be configured to be mounted to the blade root 34 using the root bolts 56 of the root attachment assemblies 52. For example, as particularly shown in FIG. 4, each root bolt 56 may extend along a longitudinal axis 82 between a first end 84 and a second end 86. The first end 84 of each root bolt 56 may be configured to be coupled to a portion of the inner bearing race 76, such as by coupling the first end 84 of each root bolt 56 to the inner bearing race 76 using an attachment nut 88 and/or other suitable fastening mechanism. The second end 86 of each root bolt 56 may be configured to be coupled to the blade root 34 using the barrel nut 54 of each root attachment assembly 52. Specifically, as shown in FIG. 4, the second end 86 of each root bolt 56 may extend into and may be secured within a threaded bolt hole 90 defined through at least a portion of each barrel nut 54. For instance, the barrel nuts 54 may be configured to be positioned within the blade root 34 such that the threaded bolt hole 90 of each barrel nut 54 is aligned with the longitudinal axis 82 of the corresponding root bolt 56. As such, the second end 86 of the root bolt 56 may be screwed into the threaded bolt hole 90 in order to secure the root bolt 56 to the barrel nut 54 and, thus, anchor the root bolt 56 to the blade root 34.

It should be appreciated that the barrel nut 54 of each root attachment assembly 22 may generally be configured the same as or similar to any suitable barrel nut known in the art. For example, as shown in FIG. 5, in several embodiments, each barrel nut 54 may have an elongated, cylindrical shape. However, in alternative embodiments, the barrel nuts 54 may have any other suitable shape, such as an elongated, rectangular shape. In addition, each barrel nut 54 may be hollow and, thus, may include an open volume within the barrel nut 54. For instance, as shown in FIG. 4, the open volume may be defined by a through-hole 92 formed in each barrel nut 54 that extends generally perpendicular to the threaded bolt hole 90.

Moreover, the barrel nut 54 of each root attachment assembly 52 may be configured to be mounted within the blade root 34 along an insertion axis 94. Specifically, in several embodiments, each barrel nut 54 may be configured to be received within one of a plurality of corresponding openings 96 defined through the blade root 34, with each opening 96 defining an insertion axis 94 extending through its center. For instance, as shown in FIG. 4, each opening 96 may be formed in the blade root 34 so as to be spaced apart from the interface defined between the root end 58 of the blade root 34 and the inner bearing race 76. A corresponding barrel nut 54 may then be installed into each opening 96 by inserting the barrel nut 54 into the opening along the insertion axis 94. It should be appreciated that the barrel nuts 54 may be secured within the openings 96 using any suitable attachment means and/or method known in the art, such as by adhering each barrel nut 54 within each opening 96 using a suitable adhesive, press-fitting each barrel nut 54 within each opening 96, screwing each barrel nut 54 into each opening 96 and/or the like.

As shown in FIG. 4, the insertion axis 94 defined through the center of each opening 96 may generally be oriented at an angle (i.e., non-parallel) relative to the longitudinal axis 82 defined by each root bolt 56. For instance, in several embodiments, the insertion axis 94 may be oriented substantially perpendicular relative to the longitudinal axis 82. However, in other embodiments, the insertion axis 94 may be oriented at any other suitable angle relative to the longitudinal axis 82, such as any angle less than 90 degrees and greater than 0 degrees.

Referring still to FIGS. 3-5, as indicated above, the wind turbine 10 may include a system 66 for detecting and/or controlling the loads transmitted through the blade root 34 of the rotor blade 22. In general, the system 66 may include one or more sensors 68, 70, 72 associated with one or more of the root attachment assemblies 52 of the rotor blade 22, with each sensor 68, 70, 72 being configured to be detect loads transmitted through the barrel nut 54 and/or the root bolt 56 of the root attachment assembly 52 with which the sensor 68, 70, 72 is associated. For instance, in several embodiments, one or more sensors 68, 70, 72 may be mounted on, within and/or adjacent to one or more of the root bolts 56 so as to detect loads transmitted through such root bolts 56. In addition to such sensors 68, 70, 72 or as an alternative thereto, one or more sensors 68, 70, 72 may be mounted on, within and/or adjacent to one or more of the barrel nuts 54 so as to detect loads transmitted through such barrel nuts 54.

It should be appreciated that the positioning of each sensor 68, 70, 72 relative to the barrel nut 54 and/or the root bolt 56 may generally depend on the types of sensors 68, 70, 72 being utilized and/or the types of loads being detected. For instance, in several embodiments, one or more of the sensors 68, 70, 72 may comprise one or more pressure sensors 68 (e.g., pressure transducers) configured to detect the pressure or contact loads transmitted between adjacent, contacting surfaces. Thus, in one embodiment, one or more pressure sensors 68 may be mounted to an outer surface 98 (FIG. 5) of one or more of the barrel nuts 54 to permit the pressure sensor(s) 68 to detect the contact loads transmitted between such barrel nuts 54 and the blade root 34. For example, as shown in FIG. 5, a pressure sensor 68 may be mounted onto the bottom half of the outer surface 98 of one of the barrel nuts 54 so that the sensor 68 is located between the barrel nut 54 and the portion of the blade root 34 extending towards the pitch bearing 60 (e.g., at the interface 100 (FIGS. 3 and 4) defined between the barrel nut 54 and the blade root 32) when the barrel nut 54 is installed within its corresponding opening 96. As such, the pressure sensor 68 may be configured to detect the pre-load between the barrel nut 54 and the blade root 34 as the root bolt 56 is tightly secured to the inner bearing race 76. Accordingly, during operation of the wind turbine 10, measurements of the contact loads between the barrel nut 54 and the blade root 34 may be compared to the initial pre-load measurement, with any variations in the measurements being attributed to loading on the rotor blade 22.

It should be appreciated that the pressure sensor location shown in FIG. 5 is only provided as one example of a suitable location at which a pressure sensor(s) 68 may be located within a root attachment assembly 52 and, thus, the present subject matter need not be limited to the embodiment shown in FIG. 5. For instance, in alternative embodiments, the pressure sensor(s) 68 may be disposed at any other suitable location along the outer surface 98 of the barrel nut 54 and/or at any other location between adjacent, contacting surfaces at which loads are being transmitted through the barrel nut 54 and/or the root bolt 56.

Additionally, in several embodiments, one or more of the sensors 68, 70, 72 of the system 66 may comprise one or more load sensors 70 (e.g., strain gauges, load cells and/or the like) configured to detect strain and/or other loads transmitted through the barrel nut 54 and/or the root bolt 56. In such embodiments, the load sensor(s) 70 may be mounted on and/or embedded within the barrel nut 54 and/or the root bolt 56 at any suitable location at which loads transmitted through such components may be detected. For instance, as shown in FIG. 5, a load sensor 70 may be embedded or otherwise disposed within the root bolt 56, such as by being mounted within a bore hole 102 defined in the root bolt 56. Additionally, as shown in FIG. 5, a load sensor 70 may be mounted to the outside of the root bolt 56 at any suitable location along its length, such as by being mounted to the exposed portion of the root bolt 56 extending through the through-hole 92 defined in the barrel nut 54. Moreover, as shown in FIG. 5, a load sensor 70 may be embedded within and/or mounted to the barrel nut 54, such as by being mounted within the barrel nut 54 along one of the surfaces defined by the through-hole 92.

In a particular embodiment of the present subject matter, one or more of the loads sensors 70 may comprise one or more ultrasonic sensors (e.g., one or more ultrasonic transducers and/or ultrasonic probes) configured to detect strain and/or other loads transmitted through the barrel nut 54 and/or the root bolt 56. In such an embodiment, the ultrasonic sensor(s) may be mounted on and/or embedded within the barrel nut 54 and/or the root bolt 56 at any suitable location at which loads transmitted through such components may be detected, such as by being embedded or otherwise disposed within the root bolt 56 (e.g., by being mounted within the bore hole 102 defined in the root bolt 56) and/or by being mounted to any other portion of the root bolt 56 (e.g., by being mounted to the first end 84 and/or the second end 86 of the root bolt 56). It should be appreciated that the ultrasonic sensor(s) may be configured to detect loads transmitted through the barrel nut 54 and/or the root bolt 56 by transmitting sound waves through the barrel nut 54 and/or the root bolt 56 and by detecting how such sound waves travel through such component(s). For instance, as is generally understood, when a material undergoes mechanical loading, the stresses within the material alter the velocity of any sound waves traveling through the material. Accordingly, by transmitting sound waves through the barrel nut 54 and/or the root bolt 56 and detecting changes in the velocity of the sound waves, the ultrasonic sensor(s) may be configured to detect loads being transmitted through the barrel nut 54 and/or the root bolt 56. Additionally, the data provided by the ultrasonic sensor(s) may also be used to inspect the barrel nut 54 and/or the root bolt 56 for non-destructive testing purposes (e.g., by using the data to detect cracks in the barrel nut 54 and/or the root bolt 56 caused by load variations over time).

It should also be appreciated that the load sensor locations shown in FIG. 5 are only provided as several examples of suitable locations at which a load sensor(s) 70 may be positioned within a root attachment assembly 52 and, thus, the present subject matter need not be limited to the embodiments shown in FIG. 5. For example, in another embodiment, one or more load sensors 70 may be positioned along the outer surface 98 of the barrel nut 54 and/or embedded within a separate bore hole (not shown) defined in the barrel nut 54.

Referring still to FIGS. 3-5, in several embodiments, one or more of the sensors 68, 70, 72 of the disclosed system 66 may comprise one or more magnetic sensors 72. In several embodiments, the magnetic sensor(s) 72 may comprise one or more magnetic field sensors. As used herein, the term "magnetic field sensor" refers to any sensor that may be used to detect changes within a magnetic field, such as by detecting changes in the direction of a vector of the magnetic field and/or changes in how the magnetic field penetrates through materials due to magnetorestriction. For instance, suitable magnetic field sensors may include magnetoresisitve sensors, inductive pick-up coils, Hall sensors, flux gate sensors, magneto-impedance sensors, magneto-optical sensors and/or the like.

To utilize the magnetorestrictive effect to detect loads transmitted through the barrel nut 54 and/or the root bolt 56, it should be appreciated that all or a portion of the barrel nut 54 and/or the root bolt 56 may need to be magnetized (e.g., by being directly magnetized or by being disposed within a magnetic field). Specifically, as is generally understood, the direction of a magnetic field vector created by a magnetized component and/or the way that a magnetic field passes through the material of a component changes as such component is subjected to loading (e.g., by being subject to tensile and/or compressive stresses, bending moments, torque and/or the like). Thus, by magnetizing all or a portion of the barrel nut 54 and/or the root bolt 56 prior to or after installed such component(s) within the rotor blade 22 and/or by positioning the barrel nut 54 and/or the root bolt 56 within a magnetic field while such component(s) are installed within the rotor blade 22, the magnetic field sensors may be utilized to detect changes within the magnetic field caused by loads being transmitted through the barrel nut 54 and/or the root bolt 56.

It should be appreciated that, in several embodiments, all or a portion of the barrel nut 54 and/or the root bolt 56 may be magnetized using any suitable magnetization method known in the art. For instance, the barrel nut 54 and/or the root bolt 56 may be magnetized by wrapping a suitable wire around a portion of the barrel nut 54 and/or the root bolt 56 and by applying a strong current through the wire. Such a magnetization method may also include heating the barrel nut 54 and/or the root bolt 56 to a temperature above its Curie point. Alternatively, separate leads of a suitable wire may be spaced apart along the barrel nut 54 and/or the root bolt 56 and a pulsating current may be applied through the wire in order to magnetize the barrel nut 54 and/or the root bolt 56.

As indicated above, in other embodiments, the barrel nut 54 and/or blade root 56 may be magnetized by generating a magnetic field within the blade root 34 so that at least a portion of the barrel nut 54 and/or blade root 56 is disposed within the magnetic field during operation of the wind turbine 10. For instance, a current carrying wire may be wrapped around, embedded within and/or disposed adjacent to a portion of the barrel nut 54 and/or the root bolt 56 (e.g., by wrapping the current carrying wire around the exposed portion of the root bolt 56 extending through the through-hole 92 defined in the barrel nut 54) such that a magnetic field is generated within the blade root 34 that passes through the barrel nut 54 and/or the blade root 56.

In alternative embodiments, the magnetic sensor(s) 72 may comprise one or more magnetic susceptometers. As is generally understood, magnetic susceptometers may be utilized to detect changes in the material susceptibility of a component due to magnetization. Accordingly, in such embodiments, the barrel nut 54 and/or the root bolt 56 need not be magnetized to permit the magnetic sensor(s) 72 to detect loads transmitted through the barrel nut 54 and/or the root bolt 56.

It should be appreciated that the magnetic sensor(s) 72 may generally be disposed at any suitable location relative to the barrel nut 54 and/or the root bolt 56 that permits such sensor(s) 72 to detect changes within the magnetic field and/or changes in magnetic susceptibility caused by loads being transmitted through the barrel nut 54 and/or the root bolt 56.

For instance, as shown in FIGS. 3 and 4, a magnetic sensor(s) 72 may be positioned within the though-hole 92 of one or more of the barrel nuts 54 and/or, as shown in FIG. 5, a magnetic sensor(s) 72 may be embedded within one or more of the root bolts 56, such as by being mounted within a bore hole 102 defined in the root bolt(s) 56. Alternatively, the magnetic sensor(s) 72 may be disposed and/or mounted at any outer suitable location(s), such as by being mounted to the outer surface 98 of the barrel nut 54, to the outside of the root bolt 56 and/or at any location within the blade root 34 that is generally adjacent to at least a portion of the barrel nut 54 and/or the root bolt 56.

It should also be appreciated that the various sensors 68, 70, 72 shown in FIGS. 3-5 are provided to illustrate examples of different sensors and/or sensor positions that may be utilized within the scope of the present subject matter. Thus, a particular root attachment assembly 66 need not include all of the sensors 68, 70, 72 shown in FIGS. 3-5. For example, in several embodiments, the root attachment assembly 66 shown in FIG. 5 may only include a single sensor 68, 70, 72, such as by mounting a single pressure sensor 68, load sensor 70 or magnetic sensor 72 on, within or adjacent to the barrel nut 54 or the blade root 56. Alternatively, the root attachment assembly 66 may include multiple sensors 68, 70, 72, such as by mounting one or more pressure sensors 68, load sensors 70 and/or magnetic sensors 72 on, within and/or adjacent to the barrel nut 54 and/or by mounting one or more pressure sensors 68, load sensors 70 and/or magnetic sensors 72 on, within and/or adjacent to the root bolt 56.

Additionally, it should be appreciated that, in several embodiments, sensors 68, 70, 72 may be installed on, within and/or adjacent to at least three of the root attachment assemblies 66 of the rotor blade 22. By utilizing sensor(s) 68, 70, 72 to detect the loads transmitted through at least three of the root attachment assemblies 66, measurements may be obtained that correspond to each directional component of the loads being transmitted through the blade root 43 (i.e., in three orthogonal directions) of each rotor blade 22, which may then be used to calculate the net shaft force, moment and/or torque that is applied through the hub 20. However, in other embodiments, sensors 68, 70, 72 may be installed on, within and/or adjacent to less than three of the root attachment assemblies 66.

Referring still to FIGS. 3-5, the sensor(s) 68, 70, 72 installed on, within and/or adjacent to any of the root attachment assemblies 66 may be configured to transmit signals (associated with the loads transmitted through the blade root 34) to the pitch controller 26 and/or the turbine controller 24 (FIG. 1) of the wind turbine 10. For instance, as shown in FIG. 3, the sensors 68, 70, 72 may be communicatively coupled to the pitch controller 26 via a wired connection, such as by coupling each sensor 68, 70, 72 to the pitch controller 26 via a junction box 104 using one or more communicative cables 106 (e.g., a looped harness to accommodate rotation of the rotor blade 22). Alternatively, the sensor(s) 68, 70, 72 may be communicatively coupled to the pitch controller 26 via a wireless connection, such as by transmitting measurement signals from the sensors 68, 70, 72 to the controller 26 using any suitable wireless communications protocol. Regardless, the signals transmitted by the sensors 68, 70, 72 may be received by the pitch controller 26 and/or the turbine controller 24 and subsequently processed and/or analyzed to correlate such signals to the loads being transmitted through the blade root 34. For instance, the pitch controller 26 and/or the turbine controller 24 may be provided with suitable software instructions that, when implemented, configure such controller(s) 26, 24 to determine the loads transmitted through the blade root 34 based on the signals provided by the sensors 68, 70, 72.

It should be appreciated that the communicative cables 106 used to couple the sensors 68, 70, 72 to the controller(s) 26, 24 (and/or to a suitable wireless transmission device) may extend into and/or may be installed within the barrel nut 24 and/or the root bolt 26 in a variety of different ways. For example, as shown in FIG. 5, the communicative cables 106 may be configured to extend within the through-hole 92 defined in the barrel nut 54 and/or through a suitable bore hole 102 defined in the root bolt 56.

Upon determining the loads transmitted through the blade root, the pitch controller 26 and/or the turbine controller 24 may be configured to control an operational parameter of the wind turbine 10, if necessary, in order to reduce or otherwise control the loads being transmitted through the blade root 34 and into the hub 20. For instance, in several embodiments, the pitch controller 26 and/or the turbine controller 24 may be configured to control the pitch angle of one or more of the rotor blades 22, such as by altering the pitch angle of one or more of the rotor blades 22 for a full or partial revolution of the blade(s) 22, to permit the loads acting on the rotor blade 22 to be reduced or otherwise controlled.

It should be readily appreciated by those of ordinary skill in the art that the pitch angle of each rotor blade 22 may be adjusted by rotating the inner bearing race 76 of the pitch bearing 60 relative to the outer bearing race 74. As shown in FIG. 3, such relative rotation of the inner and outer bearing races 76, 74 may be achieved using a pitch adjustment mechanism 32 mounted within a portion of the hub 20. In general, the pitch adjustment mechanism 32 may include any suitable components and may have any suitable configuration that allows the mechanism 32 to function as described herein. For example, as shown in the illustrated embodiment, the pitch adjustment mechanism 32 may include a pitch drive motor 108 (e.g., any suitable electric motor), a pitch drive gearbox 110, and a pitch drive pinion 112. In such an embodiment, the pitch drive motor 108 may be coupled to the pitch drive gearbox 110 so that the pitch drive motor 108 imparts mechanical force to the pitch drive gearbox 110. Similarly, the pitch drive gearbox 110 may be coupled to the pitch drive pinion 112 for rotation therewith. The pitch drive pinion 112 may, in turn, be in rotational engagement with the inner bearing race 76 (e.g., via a gear mesh) such that rotation of the pitch drive pinion 112 results in rotation of the inner bearing race 76 relative to the outer bearing race 76 and, thus, rotation of the rotor blade 22 relative to the hub 20.

As indicated above, operation of the pitch adjustment mechanism 32 may be controlled by the pitch controller 26. For example, as shown in FIG. 3, the pitch controller 26 may be communicatively coupled to the pitch adjustment mechanism 32 via a wired connection, such as by using a suitable communicative cable 114. In other embodiments, the pitch controller 26 may be communicatively coupled to the pitch adjustment mechanism 32 via a wireless connection, such as by using any suitable wireless communications protocol known in the art. It should be appreciated that, in several embodiments, the pitch controller 26 may also be communicatively coupled to the turbine controller 24 (FIG. 1) via a wired or wireless connection. As such, control signals generated by the turbine controller 24 may be transmitted to the pitch controller 26.

Additionally, it should be appreciated that, in alternative embodiments, the pitch controller 26 and/or the turbine controller 24 may be configured to control any other suitable operational parameter of the wind turbine 10 so as to reduce or otherwise control the loads being transmitted through the blade root 34 and into the hub 20. For instance, the turbine controller 24 and/or the pitch controller 26 may be configured to increase or decrease the torque demand on the wind turbine generator (not shown), reduce the rotational speed of the rotor blades 22 (e.g., by applying a brake), yaw the nacelle 16 in order to change the orientation of the nacelle 16 relative to the direction of the wind and/or the like.

It should also be appreciated that the present subject matter is also directed to a method for detecting and/or controlling the loads transmitted through the blade root 34 of a wind turbine rotor blade 22. The method may generally include receiving, with a controller 24, 26, a signal associated with a load transmitted through a root attachment assembly 66 of the rotor blade 22 and controlling an operational parameter of the wind turbine 10 based on the load transmitted through the root attachment assembly 66.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
   a body extending between a blade root and a blade tip;
   a root attachment assembly configured to couple the blade root to a hub of the wind turbine, the root attachment assembly comprising a barrel nut mounted within a portion of the blade root and a root bolt extending from the barrel nut; and
   a sensor associated with the root attachment assembly, the sensor comprising one of a pressure sensor, a load sensor or a magnetic sensor mounted on, within or adjacent to the barrel nut, the sensor being configured to detect loads transmitted through the barrel nut.

2. The rotor blade of claim 1, wherein the sensor comprises the pressure sensor, the pressure sensor being mounted to an outer surface of the barrel nut so as to detect contact loads transmitted between the outer surface and the blade root.

3. The rotor blade of claim 1, wherein the sensor comprises the load sensor, the load sensor being mounted on or within the barrel nut so as to detect loads transmitted through the barrel nut.

4. The rotor blade of claim 1, wherein the sensor comprises the magnetic sensor mounted on, within or adjacent to a portion of the barrel nut so as to detect loads transmitted through the barrel nut.

5. The rotor blade of claim 1, further comprising a plurality of root attachment assemblies and a plurality of sensors, each of the plurality of sensors being associated with one of the plurality of the root attachment assemblies.

6. The rotor blade of claim 1, wherein the barrel nut is mounted within the blade root along an insertion axis and wherein the root bolt defines a longitudinal axis, the insertion axis being angled relative to the longitudinal axis.

7. The rotor blade of claim 6, wherein the insertion axis is oriented substantially perpendicularly relative to the longitudinal axis.

8. A system for detecting loads transmitted through a blade root of a rotor blade of a wind turbine, the system comprising:
   a root attachment assembly configured to couple the blade root to a hub of the wind turbine, the root attachment assembly comprising a barrel nut mounted within a portion of the blade root and a root bolt extending from the barrel nut; and
   a sensor associated with the root attachment assembly, the sensor comprising one of a pressure sensor, a load sensor or a magnetic sensor mounted on, within or adjacent to the barrel nut, the sensor being configured to detect loads transmitted through the barrel nut.

9. The system of claim 8, wherein the sensor comprises the pressure sensor, the pressure sensor being mounted to an outer surface of the barrel nut so as to detect contact loads transmitted between the outer surface and the blade root.

10. The system of claim 8, wherein the sensor comprises the load sensor, the load sensor being mounted on or within the barrel nut so as to detect loads transmitted through a portion of the barrel nut.

11. The system of claim 8, wherein the sensor comprises the magnetic sensor mounted on, within or adjacent to a portion of the barrel nut so as to detect loads transmitted through the barrel nut.

12. The system of claim 8, further comprising a controller communicatively coupled to the sensor, the controller being configured to control an operational parameter of the wind turbine based on signals received from the sensor.

13. A method for controlling loads transmitted through a blade root of a rotor blade of a wind turbine, the method comprising:
    receiving with a controller a signal from a sensor associated with a load transmitted through a root attachment assembly of the rotor blade, the root attachment assembly comprising a barrel nut mounted within a portion of the blade root and a root bolt extending from the barrel nut, the sensor comprising of a pressure sensor, a load sensor or a magnetic sensor mounted on, within or adjacent to the barrel nut; and
    controlling an operational parameter of the wind turbine based on the load transmitted through the attachment assembly.

14. The method of claim 13, wherein controlling an operational parameter of the wind turbine based on the load transmitted through the attachment assembly comprises adjusting a pitch angle of the rotor blade using a pitch adjustment mechanism of the wind turbine.

15. The method of claim 13, wherein the sensor comprises the pressure sensor, the pressure sensor being mounted to an outer surface of the barrel nut so as to detect contact loads transmitted between the outer surface and the blade root.

16. The method of claim 13, wherein the sensor comprises the load sensor, the load sensor being mounted on or within the barrel nut so as to detect loads transmitted through a portion of the barrel nut.

17. The method of claim 13, wherein the sensor comprises the magnetic sensor mounted on, within or adjacent to a portion of the barrel nut so as to detect loads transmitted through the barrel nut.

* * * * *